US011075432B2

United States Patent
Shibata (10) Patent No.: US 11,075,432 B2
(45) Date of Patent: Jul. 27, 2021

(54) ENERGY STORAGE DEVICE AND METHOD FOR MANUFACTURING SAME

(71) Applicant: GS Yuasa International Ltd., Kyoto (JP)

(72) Inventor: Shinsuke Shibata, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 133 days.

(21) Appl. No.: 16/336,233

(22) PCT Filed: Sep. 14, 2017

(86) PCT No.: PCT/JP2017/033347
§ 371 (c)(1),
(2) Date: Mar. 25, 2019

(87) PCT Pub. No.: WO2018/061808
PCT Pub. Date: Apr. 5, 2018

(65) Prior Publication Data
US 2019/0214626 A1     Jul. 11, 2019

(30) Foreign Application Priority Data

Sep. 27, 2016   (JP) .............................. JP2016-188138

(51) Int. Cl.
*H01M 2/34*     (2006.01)
*H01M 2/16*     (2006.01)
(Continued)

(52) U.S. Cl.
CPC .......... *H01M 50/572* (2021.01); *H01G 11/06* (2013.01); *H01G 11/16* (2013.01);
(Continued)

(58) Field of Classification Search
CPC ........ H01G 11/06; H01G 11/16; H01G 11/52; H01M 10/04; H01M 10/0585; H01M 2/16;
(Continued)

(56) References Cited

U.S. PATENT DOCUMENTS

2002/0146626 A1   10/2002   Komatsu et al.
2006/0188785 A1   8/2006    Inoue et al.
(Continued)

FOREIGN PATENT DOCUMENTS

EP     2924781 A1      9/2015
JP     2007-012598 A   1/2007
(Continued)

OTHER PUBLICATIONS

Extended European Search Report (EESR) dated Sep. 27, 2019 issued in the corresponding European patent application No. 17855764.1.

(Continued)

*Primary Examiner* — Sarah A. Slifka
*Assistant Examiner* — Rachel L Zhang
(74) *Attorney, Agent, or Firm* — Rankin, Hill & Clark LLP (57) ABSTRACT

One aspect of the present invention is an energy storage device that includes an electrode assembly including a positive electrode, a heat resistance layer, a separator, and a negative electrode layered in this order, a peeling strength between the positive electrode and the heat resistance layer being larger than a peeling strength between the heat resistance layer and the separator, and the peeling strength between the heat resistance layer and the separator being larger than a peeling strength between the separator and the negative electrode.

13 Claims, 3 Drawing Sheets

(51) Int. Cl.
  *H01G 11/16* (2013.01)
  *H01G 11/52* (2013.01)
  *H01M 50/572* (2021.01)
  *H01M 4/13* (2010.01)
  *H01G 11/06* (2013.01)
  *H01M 10/0585* (2010.01)
  *H01M 10/04* (2006.01)
  *H01M 50/409* (2021.01)
  *H01M 50/46* (2021.01)

(52) U.S. Cl.
  CPC .............. *H01G 11/52* (2013.01); *H01M 4/13* (2013.01); *H01M 10/04* (2013.01); *H01M 10/0585* (2013.01); *H01M 50/409* (2021.01); *H01M 50/461* (2021.01)

(58) Field of Classification Search
  CPC .......... H01M 2/168; H01M 2/34; H01M 4/13; H01M 50/572; H01M 50/461; H01M 50/409; Y02E 60/10
  See application file for complete search history.

(56) References Cited

U.S. PATENT DOCUMENTS

| | | |
|---|---|---|
| 2006/0216608 A1 | 9/2006 | Ohata et al. |
| 2006/0269842 A1 | 11/2006 | Ichinose et al. |
| 2009/0181305 A1 | 7/2009 | Nagayama et al. |
| 2013/0236766 A1 | 9/2013 | Seo et al. |
| 2014/0004400 A1* | 1/2014 | Ueki ................. H01M 10/052 429/94 |
| 2014/0045031 A1 | 2/2014 | Matsumoto et al. |
| 2014/0154583 A1 | 6/2014 | Ueki et al. |
| 2014/0248525 A1 | 9/2014 | Iwai et al. |
| 2015/0263325 A1 | 9/2015 | Honda et al. |
| 2015/0372277 A1 | 12/2015 | Honda |
| 2016/0268571 A1* | 9/2016 | Honda ................. H01M 2/1653 |
| 2017/0179520 A1* | 6/2017 | Seo ....................... H01M 2/168 |
| 2017/0222280 A1 | 8/2017 | Asano et al. |

FOREIGN PATENT DOCUMENTS

| | | |
|---|---|---|
| JP | 2007-027100 A | 2/2007 |
| JP | 2007-242575 A | 9/2007 |
| JP | 2011-023186 A | 2/2011 |
| JP | 2011-054503 A | 3/2011 |
| JP | 2013-020769 A | 1/2013 |
| JP | 2014026986 A | 2/2014 |
| JP | 2014-149936 A | 8/2014 |
| JP | 2014-170752 A | 9/2014 |
| JP | 2015053134 A | 3/2015 |
| JP | 2015-069957 A | 4/2015 |
| JP | 5834940 B2 | 12/2015 |
| WO | 2001095421 A1 | 12/2001 |
| WO | 2005011043 A1 | 2/2005 |
| WO | 2005098997 A1 | 10/2005 |
| WO | 2012124093 A1 | 9/2012 |
| WO | 2013051079 A1 | 4/2013 |
| WO | 2014083988 A1 | 6/2014 |
| WO | 2014147888 A1 | 9/2014 |
| WO | 2016051639 A1 | 4/2016 |

OTHER PUBLICATIONS

International Search Report (ISR) dated Dec. 19, 2017 filed in PCT/JP2017/033347.

* cited by examiner

ENERGY STORAGE DEVICE AND METHOD FOR MANUFACTURING SAME

TECHNICAL FIELD

The present invention relates to an energy storage device and a method for manufacturing the energy storage device.

BACKGROUND ART

A secondary battery represented by a lithium ion secondary battery is often used, for its high energy density, in, for example, electronic devices such as a personal computer and a communication terminal, and a vehicle. The secondary battery generally includes an electrode assembly having a pair of electrodes electrically separated from each other with a separator, and includes a nonaqueous electrolyte interposed between the electrodes, and the secondary battery is configured to allow ions to be transferred between both the electrodes for charge-discharge. Capacitors such as a lithium ion capacitor and an electric double layer capacitor are also widely used as energy storage devices other than the secondary battery.

In such energy storage devices, proposed are disposition of a heat resistance layer between a resin separator and an electrode or use of a separator including a heat resistance layer to, for example, increase heat resistance (see Patent Documents 1 to 3).

PRIOR ART DOCUMENTS

Patent Documents

Patent Document 1: JP-A-2014-170752
Patent Document 2: JP-A-2014-149936
Patent Document 3: JP-A-2013-20769

SUMMARY OF THE INVENTION

Problem to be Solved by the Invention

Even these energy storage devices, however, may possibly generate heat in some cases as a result of letting current flow into a short circuit portion formed in abnormal handling in which a nail is stuck into the energy storage device, for example.

The present invention has been made under the circumstances described above, and an object of the present invention is to provide an energy storage device that enables a more decrease in current at a short circuit portion formed in abnormal use in which foreign matter such as a nail is stuck into the energy storage device, for example, and a method for manufacturing such an energy storage device.

Means for Solving the Problem

One aspect of the present invention that has been made to solve the above problem is an energy storage device that includes an electrode assembly including a positive electrode, a heat resistance layer, a separator, and a negative electrode layered in this order, a peeling strength between the positive electrode and the heat resistance layer being larger than a peeling strength between the heat resistance layer and the separator, and the peeling strength between the heat resistance layer and the separator being larger than a peeling strength between the separator and the negative electrode.

Another aspect of the present invention that has been made to solve the above problem is a method for manufacturing an energy storage device, the method including obtaining a layered product including a positive electrode, a heat resistance layer, a separator, and a negative electrode layered in this order, and adhering between the positive electrode and the heat resistance more strongly than between the heat resistance layer and the separator and between the separator and the negative electrode by heat pressure bonding along a layering direction of the layered product.

Advantages of the Invention

According to the present invention, it is possible to provide an energy storage device that enables a more decrease in current at a short circuit portion formed in abnormal use in which foreign matter such as a nail is stuck into the energy storage device, for example, and a method for manufacturing such an energy storage device.

MODE FOR CARRYING OUT THE INVENTION

One aspect of the present invention is an energy storage device that includes an electrode assembly including a positive electrode, a heat resistance layer, a separator, and a negative electrode layered in this order, a peeling strength between the positive electrode and the heat resistance layer being larger than a peeling strength between the heat resistance layer and the separator, and the peeling strength between the heat resistance layer and the separator being larger than a peeling strength between the separator and the negative electrode.

According to the energy storage device, it is possible to more decrease the current at a short circuit portion formed in abnormal use in which foreign matter such as a nail is stuck into the energy storage device, for example. A reason why such an effect is generated is not clear but is considered as follows. In the energy storage device, the adjacent positive electrode and heat resistance layer adhere to each other relatively strongly to allow the heat resistance layer to follow foreign matter that is stuck from the heat resistance layer into the positive electrode. The heat resistance layer that has followed the foreign matter is considered to inhibit direct contact between the foreign matter and the positive electrode and thus suppress a decrease in electric resistance between the positive electrode and the negative electrode (enable a more decrease in current at a short circuit portion). The effect is described in detail later with drawings.

Here, the "heat resistance layer" refers to a layer relatively more excellent in heat resistance than the separator and is a layer whose main component (a component having a largest content) has a higher softening point than the softening point of the separator. The magnitude relationship of the peeling strengths can be determined by the following method. An electrode assembly including a positive electrode, a heat resistance layer, a separator, and a negative electrode layered in this order is subjected to peeling while held or fixed at the positive electrode and the negative electrode. When either one of outermost layers (the positive electrode or the negative electrode) is peeled, the remaining layered portion is subjected to peeling while held or fixed at its both outermost layers. An interlayer portion that is not peeled by this peeling operation is defined as having a strength larger than the strengths of other interlayer portions. For example, when the positive electrode, the heat resistance layer, and the separator are not peeled but peeling between the separator and the negative electrode occurs in the first peeling, the peeling strength between the separator and the negative electrode is smallest. Next, a structure including the positive electrode, the heat resistance layer, and the separator is subjected to peeling while held or fixed at the positive electrode and the separator. Peeling between the heat resistance layer and the separator in this peeling clarifies that the peeling strength between the positive electrode and the heat resistance layer is largest. If peeling between the negative electrode and the separator does not occur but peeling between the heat resistance layer and the separator occurs, the peeling strength between the positive electrode and the heat resistance layer and the peeling strength between the separator and the negative electrode can be deemed to be larger than the peeling strength between the heat resistance layer and the separator. In cases in which the heat resistance layer is not completely peeled from the separator unlike the case described above, when the weight of the heat resistance layer left on the positive electrode is larger than the weight of the heat resistance layer left on the separator, the adhesion force between the positive electrode and the heat resistance layer can be deemed to be larger than the adhesion force between the separator and the heat resistance layer. Determination of the weight of the heat resistance layer is not particularly limited, but when the heat resistance layer contains alumina as a filler, it is possible to determine the magnitude of the heat resistance layer by ICP analysis of a solution obtained by dissolving the alumina in an acid. Alternatively, the determination can be simply made by the difference in thickness of the heat resistance layer between on the positive electrode plate and on the separator. The peel test can be performed in accordance with the 180° peel test in JIS-Z0237: 2009. When the above-mentioned method is not capable of determining the magnitude relationship of the peeling strengths, it is possible to measure the peeling strengths of interlayer portions in accordance with the above-mentioned JIS and thus determine the magnitude relationship of the peeling strengths. In this measurement, the peeling strength may be 0 in some cases.

The separator is preferably formed of a porous resin film containing a resin as a main component. Use of such a separator, for example, makes the peeling strength between the heat resistance layer and the separator appropriate to enable a further decrease in current at a short circuit portion formed in abnormal use of the energy storage device in which foreign matter such as a nail is stuck into the energy storage device, for example. The "main component" refers to a component having a mass-based largest content.

It is preferable that an adhesive resin adhere between the positive electrode and the heat resistance layer and the adhesive resin be a resin having delayed tackiness. Use of such an adhesive resin makes the peeling strength between the positive electrode and the heat resistance layer appropriate to enable a further decrease in current at a short circuit portion formed in abnormal use of the energy storage device in which foreign matter such as a nail is stuck into the energy storage device, for example. The resin having delayed tackiness exerts adhesiveness (adhesion) only when subjected to pressurization or heating, to enable efficient manufacturing. Further, use of the resin having delayed tackiness is capable of increasing the adhesiveness (adhesion) to foreign matter such as a nail by, for example, friction heat generated in abnormal use of the energy storage device in which the foreign matter such as a nail is stuck into the energy storage device, for example. This is considered to enable a further decrease in current at a short circuit portion formed in abnormal use of the energy storage device in which foreign matter such as a nail is stuck into the energy storage device, for example. The "adhesive resin" refers to a resin having adhesiveness or adhesion. The "delayed tackiness" refers to a property of a resin that has non-adhesiveness and non-adhesion at normal temperature but exerts adhesiveness or adhesion by at least one of heating or pressurization and continues to have the adhesiveness or the adhesion after the exertion even when returned to normal temperature and normal pressure.

The adhesive resin preferably contains an aqueous emulsion resin. Use of an aqueous emulsion resin as the adhesive resin increases coatability to enable a further decrease in current at a short circuit portion formed in abnormal use of the energy storage device in which foreign matter such as a nail is stuck into the energy storage device, for example.

The heat resistance layer preferably contains a bar-shaped or flat filler having an average particle size of 0.01 μm or more and 10 μm or less. The heat resistance layer containing such a filler increases its foreign matter following property in abnormal use of the energy storage device in which foreign matter such as a nail is stuck into the energy storage device, for example. Accordingly, this enables a further decrease in current at a short circuit portion formed in abnormal use of the energy storage device in which foreign matter such as a nail is stuck into the energy storage device, for example. The "bar-shaped or flat" filler refers to a filler that contains particles having an average ratio (maximum diameter/diameter orthogonal to maximum diameter) of 2 or more between a maximum diameter and a diameter orthogonal to the maximum diameter, the particles being confirmed in a section of the heat resistance layer. The average value of the ratio is to be an average value obtained from ten particles confirmed in one sectional image of the heat resistance layer in microscope observation. The average particle size is to be an average value of maximum diameters of the ten particles. Selected as the ten particles are ten largest particles having largest maximum diameters among particles confirmed in the one image.

One aspect of the present invention is a method for manufacturing an energy storage device, the method including obtaining a layered product including a positive electrode, a heat resistance layer, a separator, and a negative electrode layered in this order, and adhering between the positive electrode and the heat resistance more strongly than between the heat resistance layer and the separator and between the separator and the negative electrode by heat pressure bonding along a layering direction of the layered product. According to the manufacturing method, it is possible to obtain an energy storage device that enables a more decrease in current at a short circuit portion formed in abnormal use in which foreign matter such as a nail is stuck into the energy storage device, for example.

The layered product preferably includes an adhesive resin that is disposed between the positive electrode and the heat resistance layer and has delayed tackiness. Such use of the adhesive resin having delayed tackiness enables application of adhesiveness between the positive electrode and the heat resistance layer at any timing after formation of the layered product to be capable of, for example, increasing productivity.

Hereinafter, described are a nonaqueous electrolyte secondary battery (hereinafter, also simply referred to as a "secondary battery") as one embodiment of the energy storage device according to the present invention, and a method for manufacturing the energy storage device.

<Secondary Battery (Energy Storage Device)>

Figure 1:
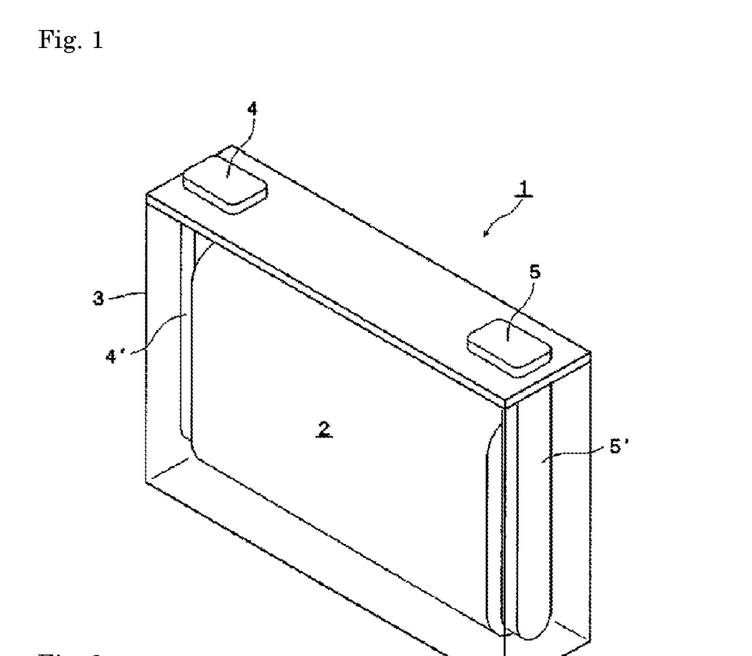
FIG. 1 is a schematic perspective view showing a secondary battery according to one embodiment of the present invention.

A secondary battery 1 in FIG. 1 includes an electrode assembly 2 and a battery case 3 for housing the electrode assembly 2. FIG. 1 is a perspective view showing an inside of the battery case 3. The electrode assembly 2 is formed by winding a pair of electrodes (a positive electrode and a negative electrode) with a separator interposed therebetween. A heat resistance layer is provided between the positive electrode and the separator. The electrode assembly 2 is described below in detail. The positive electrode is electrically connected to a positive terminal 4 via a positive lead 4', and the negative electrode is electrically connected to a negative terminal 5 via a negative lead 5'. The battery case 3 is filled with a nonaqueous electrolyte.

(Electrode Assembly)

Figure 2:
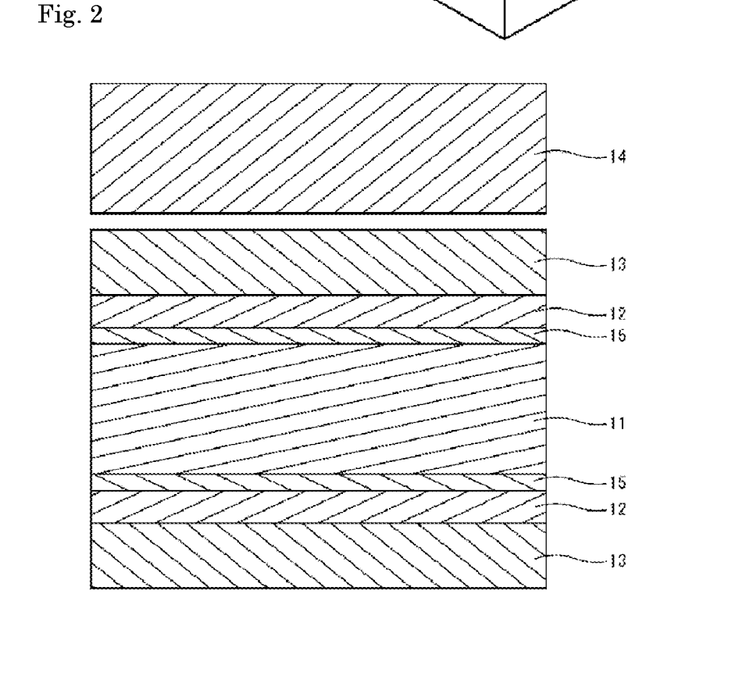
FIG. 2 is a schematic sectional view showing an electrode assembly of the secondary battery according to the one embodiment of the present invention.

The electrode assembly 2 is formed, as shown in FIG. 2, by layering a positive electrode 11, a heat resistance layer 12, a separator 13, and a negative electrode 14 in this order. In the electrode assembly 2, the heat resistance layer 12 and the separator 13 are layered on each of front and back surfaces of the positive electrode 11. The electrode assembly 2 in FIG. 2 that has a layered structure and is wound is housed in the battery case 3. In the electrode assembly 2 of FIG. 2, the separator 13 is illustrated as being separated from the negative electrode 14, but they are actually in contact with each other in the layered state.

In the electrode assembly 2, the peeling strength between the positive electrode 11 and the heat resistance layer 12 is larger than the peeling strength between the heat resistance layer 12 and the separator 13 and the peeling strength between the separator 13 and the negative electrode 14. An adhesive resin 15 adheres between the heat resistance layer 12 and the positive electrode 11. Other portions between members (between the heat resistance layer 12 and the separator 13 and between the separator 13 and the negative electrode) are formed by direct layering, but another layer may be interposed between the members. Satisfying the relationship among the peeling strengths of the interlayer portions enables a more decrease in current at a short circuit portion formed in abnormal use of the energy storage device in which foreign matter such as a nail is stuck into the energy storage device, for example. A conceivable reason for this effect is described with reference to FIG. 3.

Figure 3:
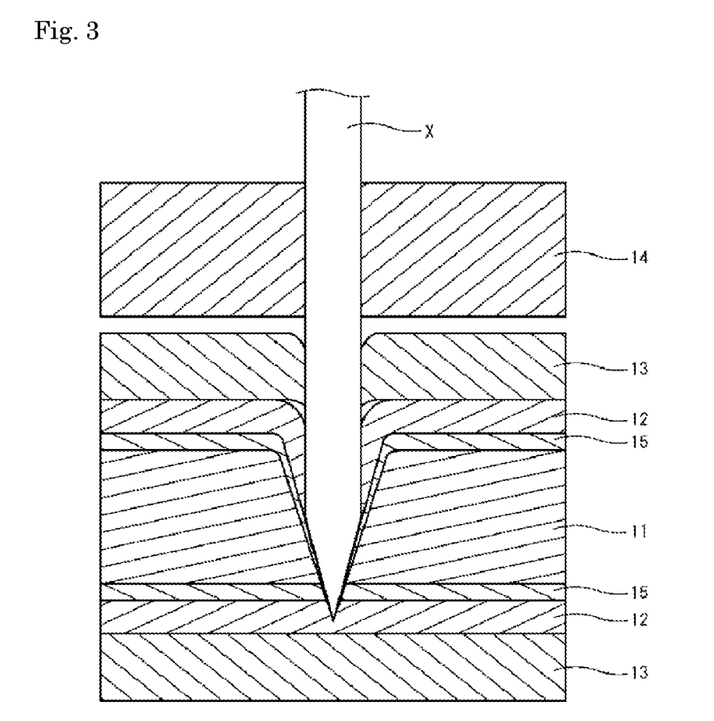
FIG. 3 is a schematic sectional view showing a state in which a nail is stuck into the electrode assembly in FIG. 2.

FIG. 3 is a diagram showing abnormal use of the electrode assembly 2 in which conductive foreign matter, or a nail X is inserted from the negative electrode 14 of the electrode assembly. When the nail X reaches and penetrates the positive electrode 11, a part of the heat resistance layer 12 follows the nail X to be dragged in the positive electrode 11. This is caused by relatively strong adhesion between the positive electrode 11 and the heat resistance layer 12. In contrast, when the peeling strength between the heat resistance layer 12 and the separator 13 or between the separator 13 and the negative electrode 14 is relatively large, the heat resistance layer 12 is unlikely to be peeled from the separator 13 to make it difficult for the heat resistance layer 12 to follow the nail X. Thus, the heat resistance layer 12 that has followed the nail X prevents contact between the nail X and the positive electrode 11. This is considered to enable a more decrease in current at a short circuit portion between the positive electrode 11 and the negative electrode 14. As described later, usually, the positive electrode 11 includes a conductive positive substrate and a conductive positive active material layer and the negative electrode includes a conductive negative substrate and a conductive negative active material layer. Among these positive substrate, positive active material layer, negative substrate, and negative active material layer, the positive active material layer usually has a highest resistance. Under such a relationship, the electrode assembly 2 of the secondary battery 1 is configured to increase the resistance of the positive electrode 11 having a relatively high resistance, when the nail X is inserted, so that the electrode assembly particularly exhibits the effect of more decreasing the current at a short circuit portion formed in abnormal use in which foreign matter such as a nail is stuck into the electrode assembly, for example.

The constituents other than the negative electrode 14, i.e., the positive electrode 11, the heat resistance layer 12, and the separator 13 are preferably integrated in the electrode assembly 2. In this case, the separator 13 and the negative electrode 14 are only adjacent to each other and are not substantially fixed to each other, for example, by an adhesive or an adhesive agent or through fusion. This configuration, for example, increases the heat resistance layer 12's nail X following property to allow the electrode assembly to more sufficiently exhibit the effect of decreasing the current at a short circuit portion formed in abnormal use in which foreign matter such as a nail is stuck into the electrode assembly, for example.

(Positive Electrode)

The positive electrode 11 includes a positive substrate and a positive active material layer disposed on the positive substrate directly or with an intermediate layer interposed between the positive active material layer and the positive substrate. The positive electrode 11 is a sheet (film) having the above-mentioned layered structure.

The positive substrate has conductivity. Used as a material for the substrate are metals such as aluminum, titanium, tantalum, and stainless steel or alloys thereof. Among these materials, aluminum and an aluminum alloy are preferable for the balance among the potential resistance, conductivity level, and cost. Exemplified as a form of the positive substrate are a foil and a deposited film, and a foil is preferable in terms of costs. That is, an aluminum foil is preferable as the positive substrate. Examples of aluminum and the aluminum alloy include A1085P and A3003P specified in JIS-H-4000 (2014).

The intermediate layer is a covering layer that covers a surface of the positive substrate, and includes conductive particles such as carbon particles to reduce contact resistance between the positive substrate and the positive active material layer. The constitution of the intermediate layer is not particularly limited and the intermediate layer can be formed of a composition containing, for example, a resin binder and conductive particles. Having "conductivity" means having a volume resistivity of $10^7$ Ω·cm or less that is measured in accordance with JIS-H-0505 (1975) and the term "non-conductivity" means having a volume resistivity of more than $10^7$ Ω·cm.

The positive active material layer is formed of a so-called positive mixture containing a positive active material. The positive mixture that forms the positive active material layer contains an optional component such as a conducting agent, a binder (binding agent), a thickener, or a filler as necessary.

Examples of the positive active material include composite oxides represented by $Li_xMO_y$ (M represents at least one transition metal) (such as $Li_xCoO_2$, $Li_xNiO_2$, $Li_xMnO_3$, $Li_xNi_\alpha Co_{(1-\alpha)}O_2$, and $Li_xNi_\alpha Mn_\beta Co_{(1-\alpha-\beta)}O_2$ that have an α-$NaFeO_2$ layered crystal structure, and $Li_xMn_2O_4$ and $Li_xNi_\alpha Mn_{(2-\alpha)}O_4$ that have a spinel crystal structure) and polyanion compounds represented by $Li_xMe_x(XO_y)_z$ (Me represents at least one transition metal and X represents, for example, P, Si, B, or V) (such as $LiFePO_4$, $LiMnPO_4$, $LiNiPO_4$, $LiCoPO_4$, $Li_3V_2(PO_4)_3$, $Li_2MnSiO_4$, and $Li_2CoPO_4F$). The elements or the polyanions in these compounds may be partially substituted with another element or anion species. For the positive active material layer, these compounds may be used alone or by mixing two or more of these compounds.

The conducting agent is not particularly limited as long as it is a conductive material that does not adversely affect battery performance. Examples of such a conducting agent include natural or artificial graphite, carbon blacks such as furnace black, acetylene black, and ketjen black, metal, and conductive ceramic. Examples of a shape of the conducting agent include powder and a fiber.

Examples of the binder (binding agent) include thermoplastic resins such as fluororesin (e.g., polytetrafluoroethylene (PTFE) and polyvinylidene fluoride (PVDF)), polyethylene, polypropylene, and a polyimide; elastomers such as ethylene-propylene-diene rubber (EPDM), sulfonated EPDM, styrene butadiene rubber (SBR), and fluororubber; and a polysaccharide polymer.

Examples of the thickener include polysaccharide polymers such as carboxymethyl cellulose (CMC) and methyl cellulose. When the thickener has a functional group reactive with lithium, the functional group is preferably inactivated by, for example, methylation in advance.

The filler is not particularly limited as long as it does not adversely affect the battery performance. Examples of a main component of the filler include polyolefins such as polypropylene and polyethylene, silica, alumina, zeolite, glass, and carbon.

(Negative Electrode)

The negative electrode 14 includes a negative substrate and a negative active material layer disposed on the negative substrate directly or with an intermediate layer interposed between the negative active material layer and the negative substrate. The negative electrode 14 is a sheet (film) having the above-mentioned layered structure. The constitution of the intermediate layer can be the same as the constitution of the intermediate layer in the positive electrode.

The negative substrate has conductivity. The constitution of the negative substrate can be the same as the constitution of the positive substrate. Used as a material for the negative substrate, however, are metals such as copper, nickel, stainless steel, and nickel-plated steel or alloys thereof, and copper or a copper alloy is preferable. That is, a copper foil is preferable as the negative substrate. Examples of the copper foil include a rolled copper foil and an electrolytic copper foil.

The negative active material layer is formed of a so-called negative mixture containing a negative active material. The negative mixture that forms the negative active material layer contains an optional component such as a conducting agent, a binder (binding agent), a thickener, or a filler as necessary. As regards the optional component such as a conducting agent, a binding agent, a thickener, or a filler, it is possible to use the same component as in the positive active material layer.

Usually used as the negative active material is a material capable of storing and releasing lithium ions. Specific examples of the negative active material include metals or metalloids such as Si and Sn; metal oxides or metalloid oxides such as a Si oxide and a Sn oxide; a polyphosphoric acid compound; and carbon materials such as graphite and amorphous carbon (easily graphitizable carbon or hardly graphitizable carbon).

The negative mixture (negative active material layer) may also contain a typical nonmetal element such as B, N, P, F, Cl, Br, or I, a typical metal element such as Li, Na, Mg, Al, K, Ca, Zn, Ga, or Ge, or a transition metal element such as Sc, Ti, V, Cr, Mn, Fe, Co, Ni, Cu, Mo, Zr, Ta, Hf, Nb, or W.

(Separator)

The separator 13 is a porous film (sheet). Used as a material for the separator 13 are, for example, woven fabric, nonwoven fabric, and a porous resin film. Among these materials, a porous resin film (pore resin film) is preferable from a viewpoint of strength. The separator 13 formed of a porous resin film contains a resin as a main component. The resin is preferably a polyolefin such as polyethylene or polypropylene from a viewpoint of strength and is preferably, for example, a polyimide or aramid from a viewpoint of resistance to oxidation decomposition. Alternatively, these resins may be made into a composite. A lower limit of the content of the resin in the separator 13 is preferably 60% by mass, more preferably 80% by mass, further preferably 95% by mass.

(Heat Resistance Layer)

The heat resistance layer 12 is a layer interposed between the positive electrode 11 and the separator 13. The heat resistance layer 12 is a layer layered on (fixed to) one surface of the separator 13. The heat resistance layer 12 that is thus layered on a surface of the separator 13 while fixed to the surface is capable of, for example, suppressing contraction of the separator 13 caused by heat generation that occurs along a short circuit between the positive electrode 11 and the negative electrode 14. The heat resistance layer 12 fixed to a surface of the separator 13 can be formed by coating the surface of the separator 13 with a heat resistance layer forming material and drying the material. Alternatively, it is also possible to use a multi-layered separator (e.g., an inorganic coated separator) sold as one having the separator 13 and the heat resistance layer 12 integrated therein.

The heat resistance layer 12 is porous. The heat resistance layer 12 that is porous secures conductibility of ions (non-aqueous electrolyte) between the positive and negative electrodes.

The heat resistance layer 12 usually contains a filler and a binder that binds the filler.

The filler may be either inorganic particles or organic particles, but is preferably inorganic particles in view of, for example, heat resistance. Examples of the inorganic particles include inorganic oxides such as silica, alumina, titania, zirconia, magnesia, ceria, yttria, zinc oxide, and iron oxide, inorganic nitrides such as silicon nitride, titanium nitride, and boron nitride, and other materials such as silicon carbide, calcium carbonate, aluminum sulfate, aluminum hydroxide, potassium titanate, talc, kaolin clay, kaolinite, boehmite, halloysite, pyrophyllite, montmorillonite, sericite, mica, amesite, bentonite, asbestos, aluminosilicate, calcium silicate, magnesium silicate, diatom earth, silica sand, and glass.

The filler is preferably a bar-shaped or flat filler. Such a bar-shaped or flat filler usually exists aligning along surfaces in the heat resistance layer 12. Such an orientational filler has a high nail or the like following property in abnormal use of the energy storage device in which foreign matter such as a nail is stuck into the energy storage device, for example. Accordingly, it is possible to more increase the effect of decreasing the current at a short circuit portion formed in abnormal use of the energy storage device in which foreign matter such as a nail is stuck into the energy storage device, for example. Examples of such a bar shaped or flat filler include kaolinite and boehmite.

An upper limit of the average particle size of the filler is preferably 10 μm, more preferably 5 μm. Such a relatively small filler has a high nail or the like following property in abnormal use of the energy storage device in which foreign matter such as a nail is stuck into the energy storage device, for example. Accordingly, it is possible to more increase the effect of decreasing the current at a short circuit portion formed in abnormal use of the energy storage device in which foreign matter such as a nail is stuck into the energy storage device, for example. On the other hand, a lower limit of the average particle size of the filler is preferably 0.01 μm, more preferably 0.05 μm from a viewpoint of, for example, heat resistance.

Usually used as the binder is one that is capable of fixing the filler, is insoluble in a nonaqueous solvent, and is electrochemically stable in a use range. Exemplified as the binder are those described above as the binder used in the positive active material layer.

The average thickness of the heat resistance layer 12 is not particularly limited, but a lower limit of the average thickness is preferably 1 μm, more preferably 2 μm, further preferably 5 μm. An upper limit of the average thickness is preferably 10 μm, more preferably 5 μm. Setting the average thickness of the heat resistance layer 12 at the lower limit or higher allows a sufficient amount of the heat resistance layer 12 to follow foreign matter such as a nail in abnormal use of the energy storage device in which the foreign matter is stuck into the energy storage device, for example. Setting the average thickness of the heat resistance layer 12 at the upper limit or lower enables a decrease in thickness of the electrode assembly 2 as a whole and thus achievement of high energy density of the secondary battery 1, for example.

(Adhesive Resin)

The adhesive resin 15 is stacked as a layer between the positive electrode 11 and the heat resistance layer 12 and adheres therebetween. A surface of the positive electrode 11 or the heat resistance layer 12 is coated with the adhesive resin 15 for layering. It is possible to adjust the peeling strength between the positive electrode 11 and the heat resistance layer 12 by the type, the layering amount, or the like of the adhesive resin 15. It is also possible to adjust the strength by the temperature or the pressure during heat pressure bonding described later.

The adhesive resin 15 is preferably a resin having delayed tackiness. The resin having delayed tackiness usually contains a thermoplastic resin, a tackifying resin, and a solid plasticizer.

Examples of the thermoplastic resin include ethylene copolymers such as an ethylene-vinyl acetate copolymer, an ethylene-methyl acrylate copolymer, and ethylene-ethyl acrylate, a polyacrylic acid ester, an acrylic acid ester copolymer, polyvinyl acetate, a vinyl acetate copolymer, and a polyolefin.

Examples of the tackifying resin include a terpene resin, an aliphatic petroleum resin, an aromatic petroleum resin, a coumarone-indene resin, a styrene resin, a phenolic resin, and a rosin derivative.

Examples of the solid plasticizer include diphenyl phthalate, dihexyl phthalate, dicyclohexyl phthalate, dihydroabiethyl phthalate, dimethyl isophthalate, sucrose benzoate, ethylene glycol dibenzoate, trimethylolethane tribenzoate, glyceride tribenzoate, pentaerythritol tetrabenzoate, sucrose octaacetate, tricyclohexyl citrate, and N-cyclohexyl-p-toluenesulfonamide.

A lower limit of the adhesiveness exertion temperature of the resin having delayed tackiness is preferably 45° C., more preferably 60° C. On the other hand, an upper limit of this temperature is preferably 100° C., more preferably 80° C. Setting the adhesiveness exertion temperature within the above range increases production efficiency and is capable of more increasing the effect of decreasing the current at a short circuit portion formed in abnormal use of the energy storage device in which foreign matter such as a nail is stuck into the energy storage device, for example.

The adhesive resin 15 preferably contains an aqueous emulsion resin. The aqueous emulsion resin refers to a resin that forms emulsion with water as a dispersion medium. Specific examples include those exemplified as the thermoplastic resin, such as ethylene copolymers such as an ethylene-vinyl acetate copolymer, an ethylene-methyl acrylate copolymer, and ethylene-ethyl acrylate, a polyacrylic acid ester, an acrylic acid ester copolymer, polyvinyl acetate, a vinyl acetate copolymer, and a polyolefin.

The adhesive resin 15 may be formed by coating with a water dispersion containing a thermoplastic resin, e.g., a polyolefin as the aqueous emulsion resin. The aqueous emulsion resin does not necessarily need to contain one or both of the tackifying resin and the solid plasticizer. In this case, a thermoplastic resin layer is formed by coating and drying and exerts adhesion or adhesiveness by fusion of its thermoplastic resin by heating. In other words, a thermally fused resin (preferably a thermoplastic resin) may adhere between the positive electrode 11 and the heat resistance layer 12.

The adhesive resin 15 may be formed of one or two or more resins. A resin that forms the adhesive resin 15 may be of a core-shell type. In addition, the adhesive resin 15 may also contain, for example, a filler or a dispersant. It is possible to use a commercially available product as, for example, the resin having delayed tackiness.

The layering amount (application amount) of the adhesive resin 15 is not particularly limited but can be set at, for example, 0.1 g/m$^2$ or more and 10 g/m$^2$ or less in terms of solid content. Setting the layering amount in the above range enables the adhesive resin to exert a suitable peeling strength.

(Nonaqueous Electrolyte)

The nonaqueous electrolyte is one obtained by dissolving an electrolyte salt in a nonaqueous solvent.

As the nonaqueous solvent, it is possible to use a known nonaqueous solvent usually used as a nonaqueous solvent of a general nonaqueous electrolyte for an energy storage device. Examples of the nonaqueous solvent include a cyclic carbonate, a chain carbonate, ester, ether, an amide, a sulfone, a lactone, and a nitrile. Among these nonaqueous solvents, it is preferable to use at least a cyclic carbonate or a chain carbonate, and it is more preferable to use a cyclic carbonate and a chain carbonate in combination. In combination use of a cyclic carbonate with a chain carbonate, the volume ratio (cyclic carbonate:chain carbonate) between the cyclic carbonate and the chain carbonate is not particularly limited but is preferably set at, for example, 5:95 or more and 50:50 or less.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate, and 1,2-diphenylvinylene carbonate.

Examples of the chain carbonate include diethyl carbonate (DEC), dimethyl carbonate (DMC), ethyl methyl carbonate (EMC), and diphenyl carbonate.

As the electrolyte salt, it is possible to use a known electrolyte salt usually used as an electrolyte salt of a general nonaqueous electrolyte for an energy storage device. Examples of the electrolyte salt include a lithium salt, a sodium salt, a potassium salt, a magnesium salt, and an onium salt. A lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a fluorohydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$, and $LiC(SO_2C_2F_5)_3$. Among these lithium salts, an inorganic lithium salt is preferable.

A lower limit of the content of the electrolyte salt in the nonaqueous electrolyte is preferably 0.1 M, more preferably 0.3 M, further preferably 0.5 M, particularly preferably 0.7 M. On the other hand, an upper limit of the content is not particularly limited but is preferably 2.5 M, more preferably 2 M, further preferably 1.5 M.

The nonaqueous electrolyte may contain a component other than the nonaqueous solvent and the electrolyte salt as long as the component does not inhibit the effects of the present invention. Examples of the other component include various additives contained in a general nonaqueous electrolyte for an energy storage device.

<Method for Manufacturing Secondary Battery (Energy Storage Device)>

A method for manufacturing a secondary battery according to one embodiment of the present invention includes:

obtaining a layered product including a positive electrode, a heat resistance layer, a separator, and a negative electrode layered in this order (step (I)); and adhering between the positive electrode and the heat resistance more strongly than between the heat resistance layer and the separator and between the separator and the negative electrode by heat pressure bonding along a layering direction of the layered product (step (II)).

The layered product that has undergone the step (II) becomes an electrode assembly in which the peeling strength between the positive electrode and the heat resistance layer is larger than the peeling strength between the heat resistance layer and the separator and the peeling strength between the separator and the negative electrode. The layered product preferably includes an adhesive resin that is disposed between the positive electrode and the heat resistance layer and has delayed tackiness.

The step (I) is not particularly limited to a specific method as long as it is capable of giving the layered product. For example, an inorganic coated separator is prepared that is formed by layering a heat resistance layer on one surface of a separator formed of a porous resin film. A resin having delayed tackiness was applied to the heat-resistance-layer-side surface of the inorganic coated separator and dried. Thereafter, a positive electrode is layered on the heat resistance layer of the inorganic coated separator and a negative electrode is layered on the separator to give a layered product.

The step (II) is not also particularly limited to a specific method as long as it is capable of adhering between the positive electrode and the heat resistance layer more strongly than between the heat resistance layer and the separator and between the separator and the negative electrode by heat pressure bonding along the layering direction of the layered product. The heat pressure bonding may be performed after the step (I) or during the step (I). That is, the layered product is formed and pressed under heating in formation of the layered product to enable simultaneous performance of the steps (I) and (II). Alternatively, the layered product obtained in the step (I) may be housed in a battery case, which is heated and pressed to perform the step (II).

Then, the layered product (electrode assembly) is housed in a battery case and the above-mentioned nonaqueous electrolyte is injected into the battery case. After the injection, an injection opening is sealed. Thus, it is possible to obtain a secondary battery (energy storage device). In the meantime, the step (II) may also be performed by heating and pressing the battery case into which the nonaqueous electrolyte has been injected.

Other Embodiments

The present invention is not limited to the embodiments described above and it is possible to implement the present invention not only by the aspects described above but also by an aspect with various changes and improvement. For example, the energy storage device according to the embodiment is configured to have no adhesion between the separator and the negative electrode. Adhesion between the separator and the negative electrode, however, may be provided as long as the peeling strength between the separator and the negative electrode is smaller than the peeling strength between the positive electrode and the heat resistance layer. Alternatively, a single-layered separator and a heat resistance sheet formed of a single-layered heat resistance layer may be prepared to make the separator adhere to the heat resistance layer (heat resistance sheet). Adhesion between members may be attained by using the adhesive resin or through other means such as thermal fusion. It is also possible to use, for example, a general adhesive resin, other than the adhesive resin having delayed tackiness.

Described in the embodiments is the energy storage device having a form of the nonaqueous electrolyte secondary battery. Another energy storage device, however, may be implemented. Examples of the other energy storage device include a capacitor (an electric double layer capacitor or a lithium ion capacitor) and a secondary battery that includes an electrolyte containing water.

Figure 4:
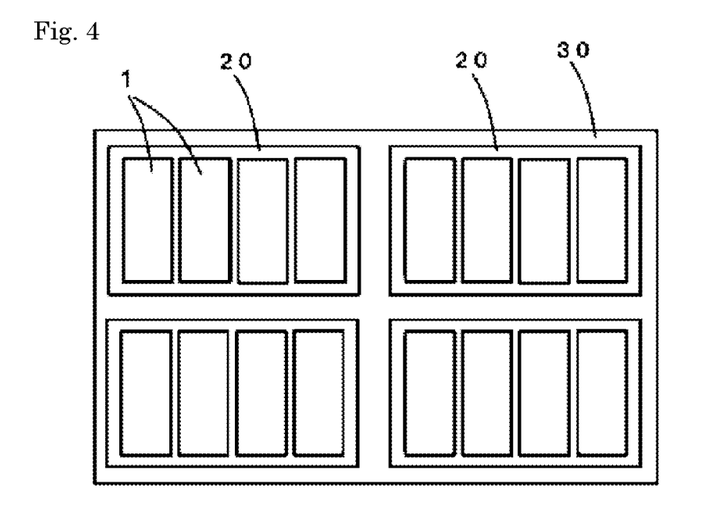
FIG. 4 is a schematic view showing an energy storage apparatus formed by collecting a plurality of secondary batteries according to the one embodiment of the present invention.

Further, the configuration of the energy storage device according to the present invention is not particularly limited, and exemplified are a cylindrical battery, a prismatic battery (rectangular battery), and a flat-type battery. The present invention can also be achieved as an energy storage apparatus including a plurality of energy storage devices. FIG. 4 shows one embodiment of the energy storage apparatus. In FIG. 4, an energy storage apparatus 30 includes a plurality of energy storage units 20. Each of the energy storage units 20 includes a plurality of energy storage devices (secondary batteries 1). The energy storage apparatus 30 can be mounted as a power source for a vehicle such as an electric vehicle (EV), a hybrid vehicle (HEV), or a plug-in hybrid vehicle (PHEV).

EXAMPLES

Hereinafter, the present invention is described further specifically by way of an example. The present invention, however, is not to be limited to the following example.

Example 1

Prepared were a positive electrode plate containing NCM111 ($LiNi_{1/3}Co_{1/3}Mn_{1/3}O_2$) as a positive active material, and a negative electrode plate containing graphite as a negative active material. A separator was prepared that was a polyethylene porous sheet having an average thickness of 25 μm. For the separator, a heat resistance layer forming material was prepared that contained alumina (average particle size: 0.7 μm) as a filler and an acrylic resin as a binder. One surface of the separator was coated with the heat resistance layer forming material and dried. This procedure formed a heat resistance layer having an average thickness of 5 μm on the surface of the separator. Next, a surface of the heat resistance layer was coated with 2.0 g/m² (in terms of solid content) of an aqueous binder resin ("CHEMIPEARL" manufactured by Mitsui Chemicals, Inc.) and dried. The aqueous binder resin is one containing a polyolefin as an aqueous emulsion resin.

Next, a layered product was formed such that the positive electrode, the heat resistance layer, the separator, and the negative electrode were layered in this order. The layered product was pressed along the layering direction under heating at 80° C. This procedure attained adhesion between the positive electrode and the heat resistance layer to give an electrode assembly having the positive electrode, the heat resistance layer, and the separator integrated therein.

Comparative Example 1

An energy storage device of Comparative Example 1 was obtained similarly to Example 1 except that the coating with the aqueous binder resin and the heat pressure bonding for the layered product were not performed. The electrode assembly of Comparative Example 1 has only the heat resistance layer and the separator integrated therein.

Comparative Example 2

An energy storage device of Comparative Example 2 was obtained similarly to Example 1 except that the heating temperature was lowered to 60° C. The electrode assembly of Comparative Example 2 has the positive electrode, the heat resistance layer, and the separator integrated therein.

Comparative Example 3

An energy storage device of Comparative Example 3 was obtained similarly to Example 1 except that the coating with the aqueous resin was performed not on the heat resistance layer but on the separator. The electrode assembly of Comparative Example 3 has the heat resistance layer, the separator, and the negative electrode integrated therein.

Comparative Example 4

An energy storage device of Comparative Example 4 was obtained similarly to Example 1 except that the coating with the aqueous resin was performed on both the heat resistance layer and the separator. The electrode assembly of Comparative Example 4 has the positive electrode, the heat resistance layer, the separator, and the negative electrode integrated therein.

[Evaluation]
(Relative Peeling Strength)

Electrode assemblies were separately prepared similarly to the example and the comparative examples. These electrode assemblies were checked for the magnitude relationship of the peeling strength among interlayer portions by the above-mentioned method. Table 1 shows interlayer portions having the largest peeling strength as results of the checking. When an electrode assembly has two interlayer portions having the largest peeling strength, Table 1 shows the two interlayer portions. Table 1 also shows integrated members in the electrode assembly of each of the example and the comparative examples.

TABLE 1

| | Integrated members | Interlayer portion having largest peeling strength |
|---|---|---|
| Example 1 | Positive electrode, heat resistance layer, and separator | Between positive electrode and heat resistance layer |
| Comparative Example 1 | Heat resistance layer and separator | Between heat resistance layer and separator |
| Comparative Example 2 | Positive electrode, heat resistance layer, and separator | Between heat resistance layer and separator |
| Comparative Example 3 | Heat resistance layer, separator, and negative electrode | Between separator and negative electrode |
| Comparative Example 4 | Positive electrode, heat resistance layer, separator, and negative electrode | Between positive electrode and heat resistance layer and between separator and negative electrode |

(Nailing Test)

Figure 5:
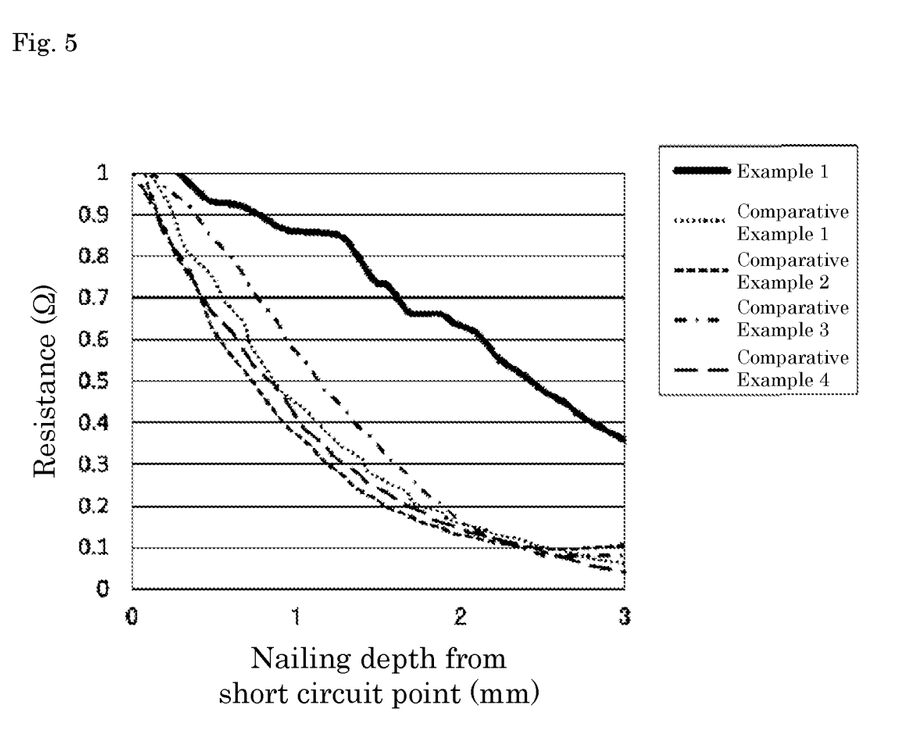
FIG. 5 is a graph showing a change of resistance in a nailing test for energy storage devices of an example and comparative examples.

A nailing test was performed by the following method. A layered product was formed by layering the heat resistance layer-attached separator, the negative electrode, the heat resistance layer-attached separator, the positive electrode, the heat resistance layer-attached separator, the negative electrode, the heat resistance layer-attached separator, the positive electrode, and the heat resistance layer-attached separator. Each "heat resistance layer-attached separator" was disposed such that the heat resistance layer faces the positive electrode. On both surfaces of the layered product were disposed a silicon rubber sheet having a thickness of 1 mm, an 2-mm acrylic board, and a 5-mm SUS plate each of which had a hole larger than a nail in the center thereof, and both the surfaces were bolted at four places. A φ 5-mm nail was inserted at 1 mm/s into the hole portion in the center of the product solidified by the bolts while the resistance between the positive and negative electrodes were measured using a DC ohmmeter, to measure the resistance between the positive and negative electrodes during the insertion. FIG. 5 shows measurement results. FIG. 5 shows the relationship between the nailing depth from the short circuit point and the electric resistance.

As shown in FIG. 5, it is clarified that the energy storage device of Example 1 is capable of greatly suppressing a decrease in electric resistance in the nailing test (decreasing the current at the short circuit portion), compared with Comparative Examples 1 to 4. Example 1 having the largest peeling strength between the positive electrode and the heat resistance layer is considered to allow the heat resistance layer to effectively follow the nail stuck into the positive electrode as described in, for example, FIG. 3, suppressing a short circuit between the positive electrode and the negative electrode. The identical result was obtained even after the product was immersed in a nonaqueous solvent (one obtained by mixing ethylene carbonate (EC) with ethyl methyl carbonate (EMC) at a volume ratio of 30:70).

On the other hand, the following reasons are considered for a great decrease in resistance in Comparative Examples 1 to 4. Comparative Examples 1 and 3 having no adhesion between the positive electrode and the heat resistance do not allow the heat resistance layer to follow the nail stuck into the positive electrode. In addition, Comparative Example 3 having strong adhesion between the negative electrode and the separator is considered to allow, for example, the separator to follow the nail stuck into the negative electrode. The negative electrode, however, has a resistance lower than the resistance of the positive electrode to give a low effect of suppressing a decrease in resistance. Further, the effect of suppressing a decrease in resistance is lower when the separator follows the nail than when the heat resistance layer follows the nail.

In Comparative Example 2 in which the positive electrode and the heat resistance layer has no strong adhesion therebetween and has the same peeling strength as between the heat resistance layer and the separator, the heat resistance layer is likely to remain on the separator in nailing and is thus hardly allowed to follow the nail, to greatly decrease the resistance. Comparative Example 4 having strong adhesion between the separator and the negative electrode also hardly allows the heat resistance layer and the separator to follow the nail to greatly decrease the resistance.

The present invention can be implemented by the following aspects.

1. An energy storage device including an electrode assembly including a positive electrode, a heat resistance layer, a separator, and a negative electrode layered in this order, a peeling strength between the positive electrode and the heat resistance layer being larger than a peeling strength between the heat resistance layer and the separator, and the peeling strength between the heat resistance layer and the separator being larger than a peeling strength between the separator and the negative electrode.

2. The energy storage device according to aspect 1, wherein the separator is directly opposite to the negative electrode.

3. The energy storage device according to aspect 1 or 2, wherein an adhesive resin adheres between the positive electrode and the heat resistance layer and the adhesive resin is a resin having delayed tackiness.

4. The energy storage device according to aspect 1 or 2, wherein the adhesive resin contains an aqueous emulsion resin.

5. The energy storage device according to aspect 1 or 2, wherein the heat resistance layer contains a bar-shaped or flat filler having an average particle size of 0.01 μm or more and 10 μm or less.

6. A method for manufacturing an energy storage device, the method including obtaining an electrode assembly including a positive electrode, a heat resistance layer, a separator, and a negative electrode layered in this order, and adhering between the positive electrode and the heat resistance layer more strongly than between the heat resistance layer and the separator and between the separator and the negative electrode by heat pressure bonding toward flat portions of longitudinal side surfaces of the electrode assembly.

7. The method for manufacturing an energy storage device according to aspect 6, wherein the electrode assembly includes an adhesive resin that is disposed between the positive electrode and the heat resistance layer and has delayed tackiness.

8. The method for manufacturing an energy storage device according to aspect 7, wherein the electrode assembly is a layered product.

9. The energy storage device according to aspect 1 or 2, wherein the heat resistance layer has a layering amount of 0.1 $g/m^2$ or more.

10. The energy storage device according to aspect 1 or 2, wherein the heat resistance layer has a layering amount of 10 $g/m^2$ or less.

11. The energy storage device according to aspect 1 or 2, wherein the heat resistance layer has a thickness of 1 μm or more.

12. The energy storage device according to aspect 1 or 2, wherein the heat resistance layer has a thickness of 10 μm or less.

13. The energy storage device according to aspect 1 or 2, wherein an adhesive resin adheres between the positive electrode and the heat resistance layer and the adhesive resin has an adhesiveness exertion temperature of 45° C. or higher.

14. The energy storage device according to aspect 1 or 2, wherein an adhesive resin adheres between the positive electrode and the heat resistance layer and the adhesive resin has an adhesiveness exertion temperature of 60° C. or higher.

15. The energy storage device according to aspect 1 or 2, wherein an adhesive resin adheres between the positive electrode and the heat resistance layer and the adhesive resin has an adhesiveness exertion temperature of 100° C. or lower.

16. The energy storage device according to aspect 1 or 2, wherein an adhesive resin adheres between the positive electrode and the heat resistance layer and the adhesive resin has an adhesiveness exertion temperature of 80° C. or lower.

17. The energy storage device according to aspect 1 or 2, wherein an adhesive resin adheres between the positive electrode and the heat resistance layer and the adhesive resin contains a polyolefin resin.

18. The energy storage device according to aspect 1 or 2, wherein the positive electrode, the heat resistance layer, and the separator are integrated.

INDUSTRIAL APPLICABILITY

The present invention is applicable to, for example, a nonaqueous electrolyte secondary battery used as a power source of, for example, electronic devices such as a personal computer and a communication terminal, or a vehicle.

DESCRIPTION OF REFERENCE SIGNS

1: Secondary battery
2: Electrode assembly
3: Battery case
4: Positive terminal
4': Positive lead
5: Negative terminal
5': Negative lead
11: Positive electrode
12: Heat resistance layer
13: Separator
14: Negative electrode 15: Adhesive resin
20: Energy storage unit
30: Energy storage apparatus
X: Nail

The invention claimed is:

1. An energy storage device comprising an electrode assembly including a positive electrode, a heat resistance layer, a separator, and a negative electrode layered in this order, the heat resistance layer including an inorganic particle,
a peeling strength between the positive electrode and the heat resistance layer being larger than a peeling strength between the heat resistance layer and the separator, and the peeling strength between the heat resistance layer and the separator being larger than a peeling strength between the separator and the negative electrode.

2. The energy storage device according to claim 1, wherein the separator is directly opposite to the negative electrode.

3. The energy storage device according to claim 1, wherein
an adhesive resin adheres between the positive electrode and the heat resistance layer, and
the adhesive resin is a resin having delayed tackiness.

4. The energy storage device according to claim 3, wherein the adhesive resin contains an aqueous emulsion resin.

5. The energy storage device according to claim 1, wherein the heat resistance layer contains a bar-shaped or flat filler having an average particle size of 0.01 µm or more and 10 µm or less.

6. A method for manufacturing an energy storage device, the method comprising:
obtaining an electrode assembly including a positive electrode, a heat resistance layer, a separator, and a negative electrode layered in this order; and
adhering between the positive electrode and the heat resistance more strongly than between the heat resistance layer and the separator and between the separator and the negative electrode by heat pressure bonding toward flat portions of longitudinal side surfaces of the electrode assembly.

7. The method for manufacturing an energy storage device according to claim 6, wherein the electrode assembly includes an adhesive resin that is disposed between the positive electrode and the heat resistance layer and has delayed tackiness.

8. The energy storage device according to claim 1, wherein the separator and the negative electrode are not substantially fixed to each other by an adhesive.

9. The energy storage device according to claim 1, wherein an adhesive resin adheres between the positive electrode and the heat resistance layer, and the adhesive resin includes a polyolefin as an aqueous emulsion resin.

10. The energy storage device according to claim 1, wherein an adhesive resin adheres between the positive electrode and the heat resistance layer, and the adhesive resin includes at least one selected from a group consisting of a terpene resin, an aliphatic petroleum resin, an aromatic petroleum resin, a coumarone-indene resin, a styrene resin, a phenolic resin and a rosin derivative.

11. The energy storage device according to claim 1, wherein an adhesive resin adheres between the positive electrode and the heat resistance layer, and the adhesive resin includes at least one selected from a group consisting of diphenyl phthalate, dihexyl phthalate, dicyclohexyl phthalate, dihydroabiethyl phthalate, dimethyl isophthalate, sucrose benzoate, ethylene glycol dibenzoate, trimethylolethane tribenzoate, glyceride tribenzoate, pentaerythritol tetrabenzoate, sucrose octaacetate, tricyclohexyl citrate and N-cyclohexyl-p-toluenesulfonamid.

12. The energy storage device according to claim 1, wherein an adhesive resin adheres between the positive electrode and the heat resistance layer, and an application amount of the adhesive resin is 0.1 g/m$^2$ or more and 10 g/m$^2$ or less in terms of solid content.

13. The energy storage device according to claim 1, wherein the separator and the negative electrode are not substantially fixed to each other by an adhesive,
an adhesive resin adheres between the positive electrode and the heat resistance layer, the adhesive resin includes a polyolefin as an aqueous emulsion resin, and
an application amount of the adhesive resin is 0.1 g/m$^2$ or more and 10 g/m$^2$ or less in terms of solid content.

* * * * *